(12) United States Patent
Pearson et al.

(10) Patent No.: US 9,350,773 B2
(45) Date of Patent: May 24, 2016

(54) CUSTOMIZABLE ACTION CARDS FOR NETWORKING SYSTEMS

(75) Inventors: Gregory A. Pearson, Dunedin, FL (US); Ronald Shane Hamilton, St. Petersburg, FL (US); David B. Hall, New Port Richey, FL (US)

(73) Assignee: GREGORY A. PEARSON, INC., Dunedin, FL (US)

( * ) Notice: Subject to any disclaimer, the term of this patent is extended or adjusted under 35 U.S.C. 154(b) by 182 days.

(21) Appl. No.: 12/709,205

(22) Filed: Feb. 19, 2010

(65) Prior Publication Data

US 2011/0209071 A1 Aug. 25, 2011

(51) Int. Cl.
*G06F 3/048* (2013.01)
*H04L 29/06* (2006.01)
*G06Q 50/00* (2012.01)

(52) U.S. Cl.
CPC .............. *H04L 65/403* (2013.01); *G06Q 50/01* (2013.01)

(58) Field of Classification Search
USPC ........................................................ 715/753
See application file for complete search history.

(56) References Cited

U.S. PATENT DOCUMENTS

| | | | |
|---|---|---|---|
| 2007/0162432 A1* | 7/2007 | Armstrong et al. ................ | 707/3 |
| 2008/0008440 A1* | 1/2008 | Shore et al. ..................... | 386/52 |
| 2008/0091771 A1* | 4/2008 | Allen et al. .................... | 709/203 |
| 2009/0031232 A1* | 1/2009 | Brezina et al. ................ | 715/764 |
| 2009/0037413 A1* | 2/2009 | Castell et al. ..................... | 707/7 |
| 2009/0144376 A1* | 6/2009 | Moscatelli et al. ........... | 709/206 |
| 2009/0181653 A1* | 7/2009 | Alharayeri ................. | 455/414.1 |
| 2009/0326970 A1* | 12/2009 | Estrada et al. .................... | 705/1 |
| 2009/0327906 A1* | 12/2009 | Heinemann ................... | 715/739 |
| 2010/0167648 A1* | 7/2010 | Doutriaux .................... | 455/41.2 |

* cited by examiner

Primary Examiner — William Bashore
Assistant Examiner — Henry Orr
(74) Attorney, Agent, or Firm — Troutman Sanders LLP; James E. Schutz; Christopher C. Close, Jr.

(57) ABSTRACT

Networking systems and methods for efficiently facilitating interactions between subscribers using customized action cards are disclosed. A networking system can comprise a communication unit, a customization unit, and an action unit. The communication unit can transmit data embodying communications between a server and a plurality of client computers operated by subscribers of the networking system. The customization unit can enable a current user to categorize other subscribers and to select action indicators associated with an action card template for each subscriber category. The selected action indicators can vary across subscriber categories, resulting in a different action card template for each category. Action cards of other subscribers are displayed to the current user based on their applicable action card templates. When the current user requests performance of an interaction by selecting a first action indicator from a displayed first action card, the action unit can facilitate the requested interaction.

6 Claims, 9 Drawing Sheets

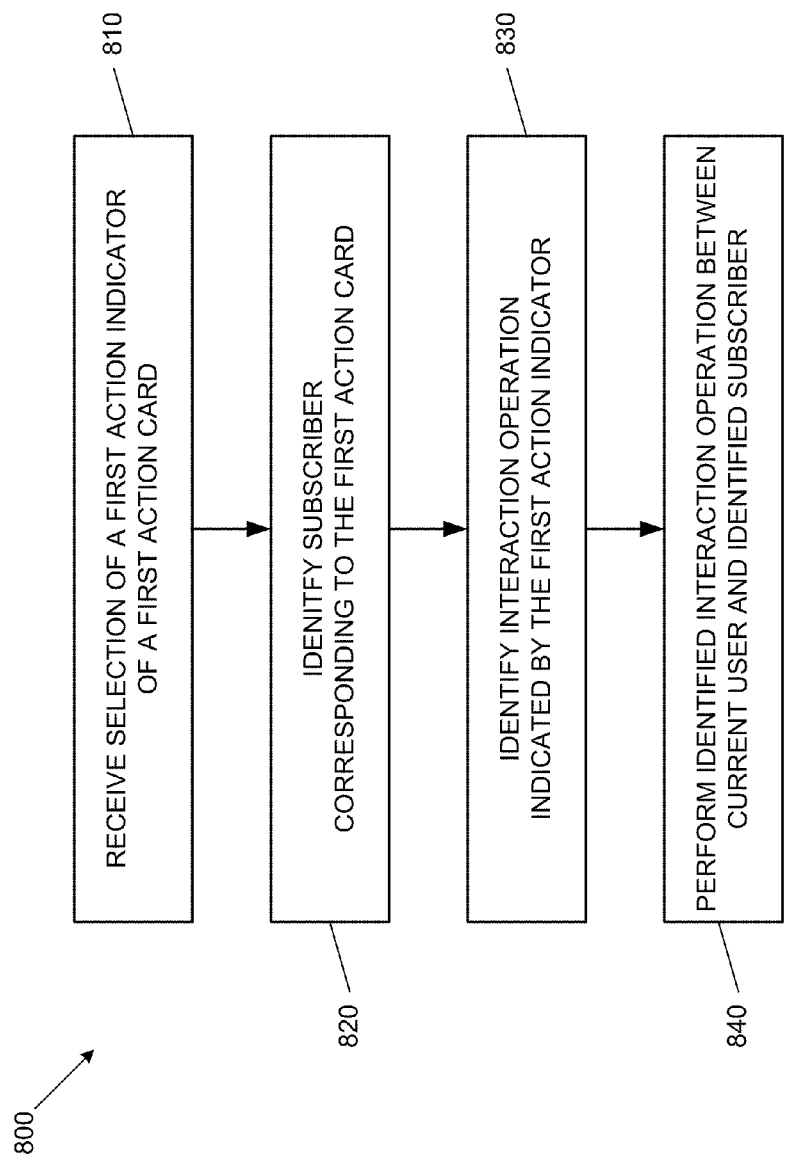

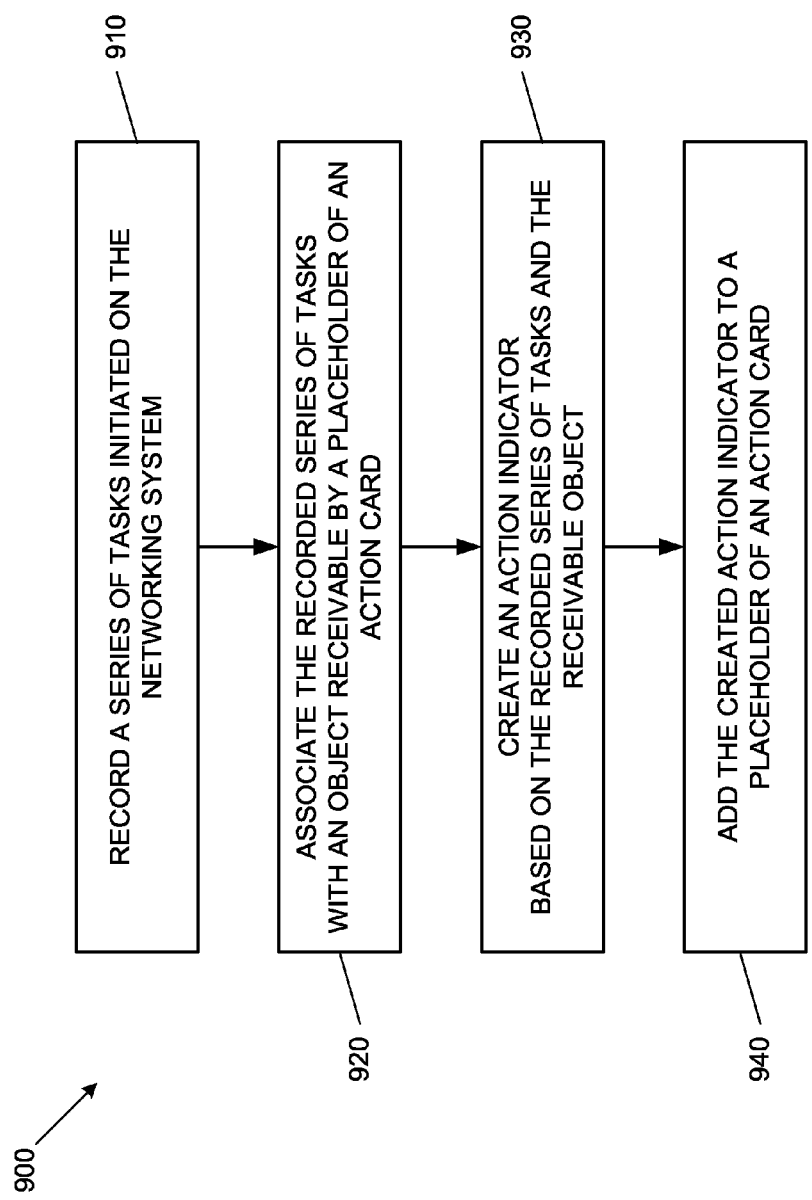

CUSTOMIZABLE ACTION CARDS FOR NETWORKING SYSTEMS

TECHNICAL FIELD

Various embodiments of the present invention relate to networking systems and, more particularly, to networking systems having customizable action cards for facilitating efficient interactions between subscribers.

BACKGROUND

Social networking systems, usually embodied in social networking websites, are a popular means for individuals and entities to interact with one another remotely within a virtual environment. Social networking systems generally display each user with a list of other subscribers of the system. The displayed list may include an alias, picture, and brief other information about other subscribers. To interact with another subscriber of a conventional social networking system, the current user may select one of the other subscribers, and may resultantly be directed to a profile page of the selected subscriber. From the profile page, the current user may be able to perform various operations to interact with the selected subscriber.

A drawback of conventional social networking systems is their inability to provide users with means to efficiently facilitate subscriber interactions. By requiring a current user to visit another subscriber's profile page before accessing most potential interaction operations, conventional systems do not make efficient use of available interactions. Some social networking systems attempt to address this problem by allowing users to utilize predetermined system-defined shortcuts to interact with other subscribers without visiting profile pages. These system-defined shortcuts, however, may not embody the interactions most useful to individual system users.

Therefore, there is a need for a networking system that enables a user to customize shortcuts for interacting with other subscribers. In an exemplary embodiment, the user can categorize subscribers and customize shortcuts that vary between subscriber categories, so as to interact differently with different subscriber categories. It is to such networking systems that various embodiments of the present invention are directed.

SUMMARY

Exemplary embodiments of the present invention can include networking systems and methods enabling subscribers to interact with one another efficiently using customizable action cards. According to an exemplary embodiment, a networking system can comprise a communication unit, a customization unit, and an action unit.

The communication unit can transmit data embodying communications between a server and a plurality of client computers. The client computers can be operated by subscribers of the networking system, who can communicate with one another through the server because of the data transmitted by the communication unit.

The customization unit can enable a current user of the networking system to categorize other subscribers and to select action indicators to be associated with each subscriber category. The customization unit can present the current user with an action card template for each subscriber category and can also present the current user with a plurality of action indicators. Each action indicator can correspond to an interaction operation that can be performed between the current user and another subscriber of the networking system. The current user can select a subset of the action indicators for inclusion in each action card template, where the selected subset can vary between action card templates. When an action card corresponding to a particular subscriber is displayed to the current user, that action card can include the action indicators selected by the current user as applying to the action card template of the subscriber's category.

The action unit can facilitate interactions between subscribers based on use of the action cards. When the current user requests performance of an interaction by selecting a first action indicator from a displayed first action card, the action unit can facilitate the requested interaction. The action unit can determine which interaction is indicated by the first action indicator, and can perform that interaction between the current user and the subscriber corresponding to the first action card. Accordingly, the user can efficiently interact with that subscriber based on the user's customized action card for the subscriber.

These and other objects, features, and advantages of the networking system will become more apparent upon reading the following specification in conjunction with the accompanying drawing figures.

BRIEF DESCRIPTION OF THE FIGURES

FIG. 8 illustrates a diagram of a method of initiating an operation through use of an action card of the networking system, according to an exemplary embodiment of the present invention.

FIG. 9 illustrates a diagram of a method of creating an action indicator, according to an exemplary embodiment of the present invention.

DETAILED DESCRIPTION

Figure 1:
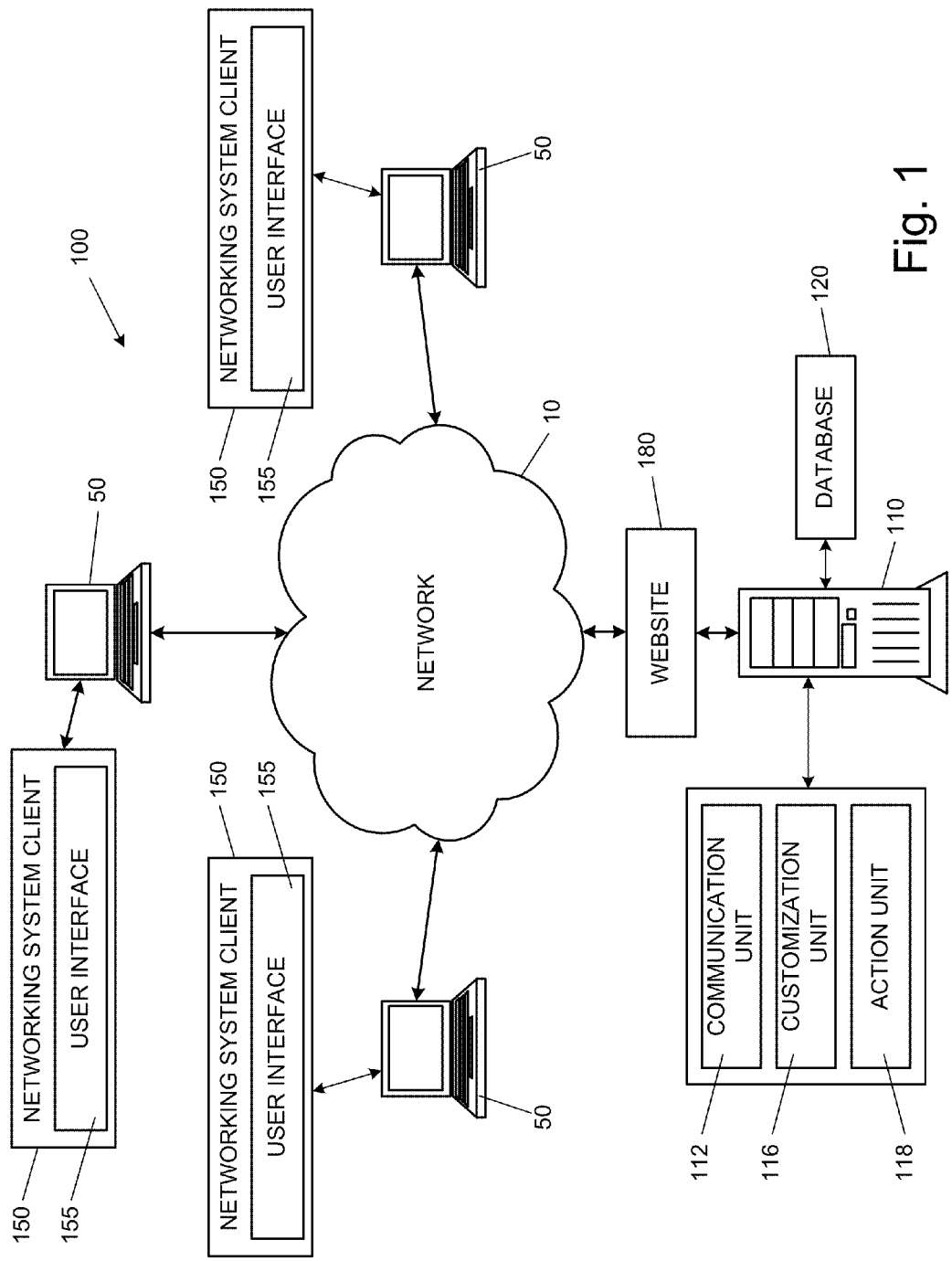
FIG. 1 illustrates a network environment in which a networking system with customizable action cards can operate, according to an exemplary embodiment of the present invention.

Exemplary embodiments of the present invention comprise action cards for networking systems, as well as networking systems using those action cards. An action card can be presented to a current user of a networking system and can represent another subscriber of the networking system. The action card can contain a plurality of action indicators, where each action indicator represents an operation that the current user can request to be performed between the current user and the other subscriber. When the current user selects an action card indicator from the other subscriber's action card, the networking system can perform the indicated action between the current user and the other subscriber. Available actions indicated on action cards can be customized by the current user. These actions can be, for example, and not limitation, actions for beginning a chat session, sending an email, adding to a friends list, or various other tasks.

To facilitate an understanding of the principles and features of the present invention, various exemplary embodiments are explained below for illustrative purposes. In particular, embodiments of the networking system are described in the context of incorporating action cards for facilitating interactions between subscribers belonging to multiple classes or categories of a social networking system. Embodiments of the invention, however, are not limited to this context. Rather, embodiments of the invention can facilitate interactions between subscribers on various types of networking systems, and the networking systems need not support multiple subscriber classes.

The components described hereinafter as making up various elements of the invention are intended to be illustrative and not restrictive. Other suitable components that would perform the same or similar functions as components described herein are intended to be embraced within the scope of the networking systems of the present invention. Such other components not described herein but potentially embraced by the invention may include, but are not limited to, for example, components developed after development of the invention.

According to the present invention, an exemplary networking system can have a plurality of user accounts associated with various individuals or entities. Throughout this disclosure, the term "subscriber" is generally used to refer to an individual or entity that has a user account with the networking system. A subscriber may, but need not, be currently logged in to the networking system. The term "user" is generally used throughout this disclosure to refer to a subscriber who is currently logged in to the networking system.

The networking system can provide action cards for subscribers to efficiently interact with one another. Through a user account of the networking system, a current user can simultaneously view a plurality of action cards corresponding to other subscribers of the networking system. Each action card can indicate the subscriber corresponding to that action card and can also include a plurality of action indicators, where each action indicator corresponds to an action that can be performed by the networking system between the current user and the subscriber corresponding to the action card. When the current user selects an action indicator on one of the interaction cards, the networking system can respond by performing the action indicated by the action indicator and, where appropriate, by performing that action between the current user and the subscriber corresponding to the action card.

The action cards viewable by the current user can be customizable by the current user to contain the action indicators that the current user finds most useful. The networking system can provide one or more action card templates for each current user, and the current user can customize these templates to indicate the action indicators that appear in other subscribers' action cards, as viewed through the current user's account.

The current user can categorize other subscribers within the current user's account based on system-defined categories and categories defined by the current user. In an exemplary embodiment of the networking system, the current user can customize an action card template for each available category of subscribers. When action cards are presented to the current user by the networking system, the action indicators in each card correspond to those selected by the current user for the subscriber category to which the subscriber represented by the action card belongs. As a result, if the current user utilizes certain operations more in interacting with a first category of subscribers than with a second category of subscribers, the current user can customize the action cards of those subscriber categories accordingly.

Categories and customizations of action card templates can vary between user accounts. As a result, an action card representing a particular subscriber may appear with different action indicators when viewed through different user accounts. Accordingly, each user can customize his or her own easily accessible interactions with other subscribers, based on categorizing the other subscribers and customizing action card templates.

Referring now to the figures, wherein like reference numerals represent like parts throughout the views, various embodiments of action cards and networking systems and methods will be described in detail.

FIG. 1 illustrates a diagram of a networking environment in which embodiments of the networking system 100 can operate. The networking system 100 can be, for example, a social networking system in which subscribers, which can be individuals or entities, connect and interact with one another for social or other purposes. For example, and not limitation, the networking system 100 can be an employment search website, through which potential employers and employees can interact with one another. Alternatively, the networking system 100 can enable friends, acquaintances, and business associates to interact with one another.

As shown in FIG. 1, the networking system 100 can be implemented between two or more client computers 50 and a server 110, where the client computers 50 can be operated by subscribers of the networking system 100. The client computers 50 can be connected to the server 110 by one or more networks 10, such as the internet. Through the server 110, the client computers 50 can be in communication with one another, and if a peer-to-peer network is used, the client computers 50 can also or alternatively be in communication with one another without being directed through the server 110.

Figure 2:
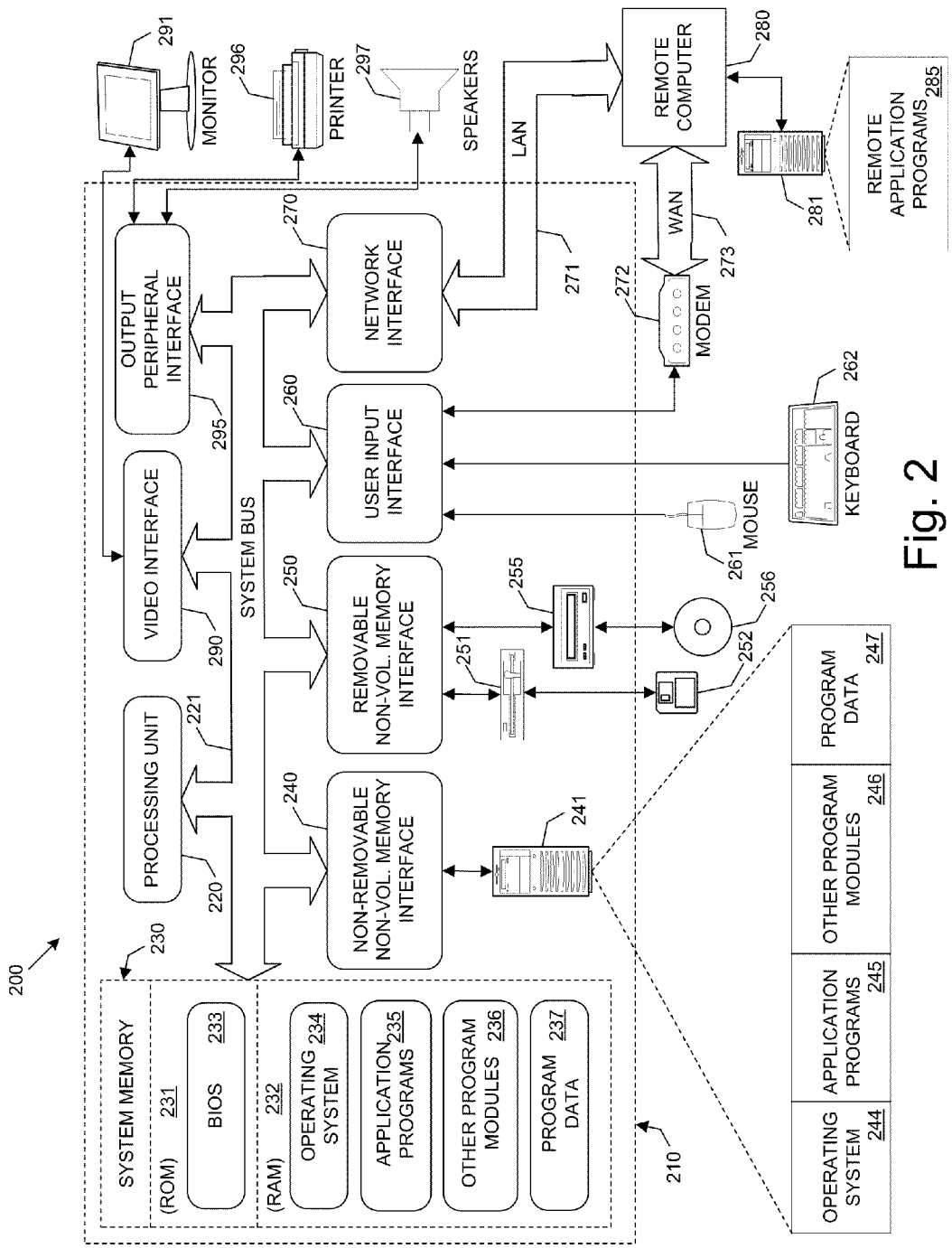
FIG. 2 illustrates an exemplary computing device useable in the networking system, according to an exemplary embodiment of the present invention.

FIG. 2 illustrates an example of a suitable computing device 200 that can be used as a client computer 50 or a server 110, in an exemplary embodiment in the networking system 100. Although specific components of a computing device 200 are illustrated in FIG. 2, the depiction of these components in lieu of others does not limit the scope of the invention. Rather, various types of computing devices can be used to implement embodiments of the networking system 100. Exemplary embodiments of the networking system 100 can be operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Exemplary embodiments of the networking system 100 can be described in a general context of computer-executable instructions, such as one or more applications or program modules, stored on a computer-readable medium and executed by a computer processing unit. Generally, program modules can include routines, programs, objects, components, or data structures that perform particular tasks or implement particular abstract data types. Embodiments of the networking system 100 can also be practiced in distributed computing environments, where tasks are performed by remote processing devices that are linked through a communications network. In a distributed computing environment, the server 110 can comprise multiple computing devices 200, and processes that would otherwise be performed by the server 110 can be executed by client computers 50 or other devices located remotely from one another.

With reference to FIG. 2, components of the computing device 200 can comprise, without limitation, a processing unit 220 and a system memory 230. A system bus 221 can couple various system components including the system memory 230 to the processing unit 220. The system bus 221 can be any of several types of bus structures including a memory bus or memory controller, a peripheral bus, and a local bus using any of a variety of bus architectures. By way of example, and not limitation, such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 200 can include a variety of computer readable media. Computer-readable media can be any available media that can be accessed by the computing device 200, including both volatile and nonvolatile, removable and non-removable media. For example, and not limitation, computer-readable media can comprise computer storage media and communication media. Computer storage media includes both volatile and nonvolatile, removable and non-removable media implemented in any method or technology for storage of information such as computer readable instructions, data structures, program modules or other data. Computer storage media can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store data accessible by the computing device 200.

Communication media can typically contain computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, and not limitation, communication media includes wired media such as a wired network or direct-wired connection, and wireless media such as acoustic, RF, infrared and other wireless media. Combinations of any of the above can also be included within the scope of computer readable media.

The system memory 230 can comprise computer storage media in the form of volatile and/or nonvolatile memory such as read only memory (ROM) 231 and random access memory (RAM) 232. A basic input/output system 233 (BIOS), containing the basic routines that help to transfer information between elements within the computing device 200, such as during start-up, can typically be stored in the ROM 231. The RAM 232 typically contains data and/or program modules that are immediately accessible to and/or presently in operation by the processing unit 220. For example, and not limitation, FIG. 2 illustrates operating system 234, application programs 235, other program modules 236, and program data 237.

The computing device 200 can also include other removable/non-removable, volatile/nonvolatile computer storage media. By way of example only, FIG. 2 illustrates a hard disk drive 241 that can read from or write to non-removable, nonvolatile magnetic media, a magnetic disk drive 251 for reading or writing to a nonvolatile magnetic disk 252, and an optical disk drive 255 for reading or writing to a nonvolatile optical disk 256, such as a CD ROM or other optical media. Other removable/non-removable, volatile/nonvolatile computer storage media that can be used in the exemplary operating environment can include magnetic tape cassettes, flash memory cards, digital versatile disks, digital video tape, solid state RAM, solid state ROM, and the like. The hard disk drive 241 can be connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2 can provide storage of computer readable instructions, data structures, program modules and other data for the computing device 200. For example, hard disk drive 241 is illustrated as storing an operating system 244, application programs 245, other program modules 246, and program data 247. These components can either be the same as or different from operating system 234, application programs 235, other program modules 236, and program data 237.

A web browser application program 235, or web client, can be stored on the hard disk drive 241 or other storage media. The web client can comprise an application program 235 for requesting and rendering web pages, such as those created in Hypertext Markup Language ("HTML") or other markup languages. The web client can be capable of executing client side objects, as well as scripts through the use of a scripting host. The scripting host executes program code expressed as scripts within the browser environment. Additionally, the web client can execute web application programs 235, which can be embodied in web pages.

A user of the computing device 200 can enter commands and information into the computing device 200 through input devices such as a keyboard 262 and pointing device 261, commonly referred to as a mouse, trackball, or touch pad. Other input devices (not shown) can include a microphone, joystick, game pad, satellite dish, scanner, electronic white board, or the like. These and other input devices are often connected to the processing unit 220 through a user input interface 260 coupled to the system bus 221, but can be connected by other interface and bus structures, such as a parallel port, game port, or a universal serial bus (USB). A monitor 291 or other type of display device can also be connected to the system bus 221 via an interface, such as a video interface 290. In addition to the monitor, the computing device 200 can also include other peripheral output devices such as speakers 297 and a printer 296. These can be connected through an output peripheral interface 295.

The computing device 200 can operate in a networked environment using logical connections to one or more remote computers, such as a remote computer 280. The remote computer 280 can be a personal computer, a server, a router, a network PC, a peer device, or other common network node, and can include many or all of the elements described above relative to the computing device 200, including a memory storage device 281. The logical connections depicted in FIG. 2 include a local area network (LAN) 271 and a wide area network (WAN) 273, but can also include other networks.

When used in a LAN networking environment, the computing device 200 can be connected to the LAN 271 through a network interface or adapter 270. When used in a WAN networking environment, the computing device 200 can include a modem 272 or other means for establishing communications over the WAN 273, such as the internet. The modem 272, which can be internal or external, can be connected to the system bus 221 via the user input interface 260 or other appropriate mechanism. In a networked environment, program modules depicted relative to the computing device 200 can be stored in the remote memory storage device. For example, and not limitation, FIG. 2 illustrates remote application programs 285 as residing on memory device 281. It will be appreciated that the network connections shown are exemplary and other means of establishing a communications link between the computers can be used.

Referring back to FIG. 1, an exemplary embodiment of the networking system 100 is preferably a centralized system, in which communications between client computers 50 are directed through the server 110. In addition to some of the various components described above with reference to FIG. 2, the server 110 can also comprise, or have access to, a database 120 for storing and maintaining data related to the networking system 100, and the server 110 can also comprise one or more operative units 112, 116, and 118. In some embodiments, the server 110 supports and services a website 180 accessible by the client computers 50 for interacting with the networking system 100. Although, throughout this disclosure, operations of the networking system 100 are described as occurring in a website environment, this need not be the case, and alternative implementations of the networking system 100 can be provided.

Each client computer 50 can access the networking system 100 through an application program, such as a networking system client 150. The networking system client 150 can, but need not, be a web application program executable by a web client. Through a user interface 155 of the networking system client 150, a user at a client computer 50 can access various aspects of the networking system 100. The user interface 155 can be an interface in which the user can, for example, interact with the website 180 or other users at other client computers 50.

The server 110 can comprise one or more units for operation of various tasks of the networking system 100. These units of the server 110 can be modules, applications, devices, systems, services, or combinations or portions thereof. Such units on the server 110 can include a communication unit 112, a customization unit 116, and an action unit 118. The units can utilize a computer processor of the server 110 for performing various operations, and can be in communication with one another as necessary to perform tasks for the networking system 100.

The networking system 100 can have a plurality of subscribers who have subscribed to, or registered with, the networking system 100. Each subscriber can have a user account on the networking system 100, and each user account can be at least partially customized to suit the subscriber corresponding to the account. The communication unit 112 of the server 110 can transmit data between the server 110 and the client computers 50, thereby enabling the subscribers of the networking system 100 to interact with one another as described herein.

Figure 3:
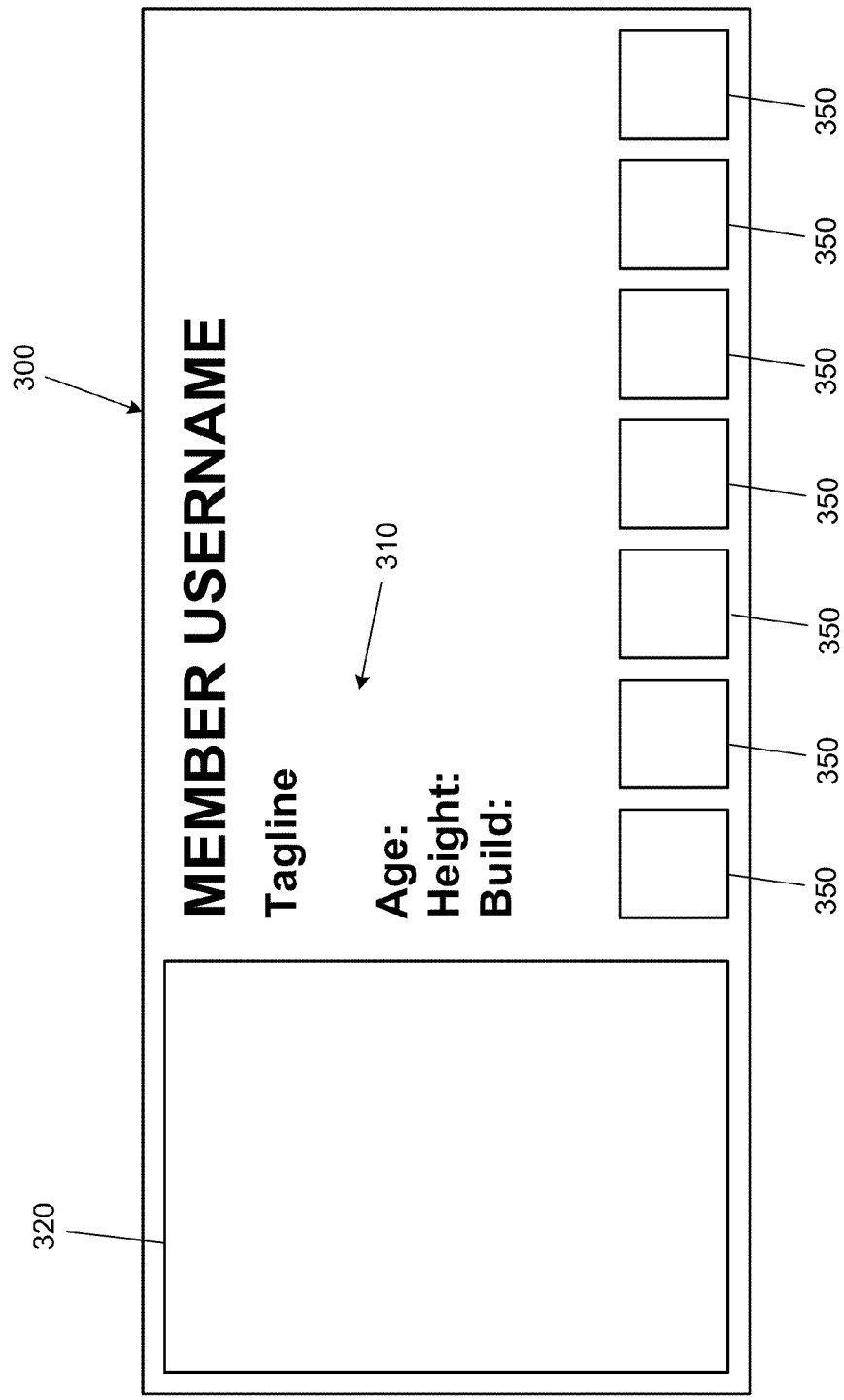
FIG. 3 illustrates a customizable action card of the networking system, according to an exemplary embodiment of the present invention.

FIG. 3 illustrates an exemplary action card 300, which can be used by the networking system 100 to present subscribers with information related to other subscribers and can enable subscribers to efficiently perform tasks and interact with one another. As shown in FIG. 3, an action card 300 can comprise, for example, member information 310, a member picture 320, and one, two, or more placeholders 350. The member information 310 can be basic information about a subscriber corresponding to the action card 300. For example, as shown, the member information 310 can include the subscriber's username, tagline, age, height, and build description. The picture 320 can be a picture 320 selected by the corresponding subscriber to represent the subscriber. While the member picture 320 may be a photograph of the corresponding subscriber, this need not be the case, and any appropriate picture can be selected by a subscriber to represent the subscriber in action cards 300 throughout the networking system 100.

The placeholders 350 of the action cards 300 can receive and contain action indicators 420, which will be described in more detail with reference to FIG. 4. In an exemplary embodiment, an action card 300 has a plurality of placeholders 350 that can be customized with action indicators 420 by each subscriber through that subscriber's account. The placeholders 350 can be of a size and shape for receiving a standard action indicator 420. For example, in FIG. 3, the placeholders 350 are rectangular, as are the action indicators 420 depicted in FIG. 4. Alternatively, a placeholder 350 can have a default shape and can adapt to the shape of an action indicator 420 placed in the placeholder 350. Action cards 300 viewable and customizable on a subscriber's account can be those action cards 300 corresponding to other subscribers. In an exemplary embodiment, customization of other subscribers' action cards 300 can be controlled by each subscriber through each user account. Consequently, each individual subscriber can view and interact with action cards 300 that look and act the way that individual subscriber finds useful.

Figure 4:
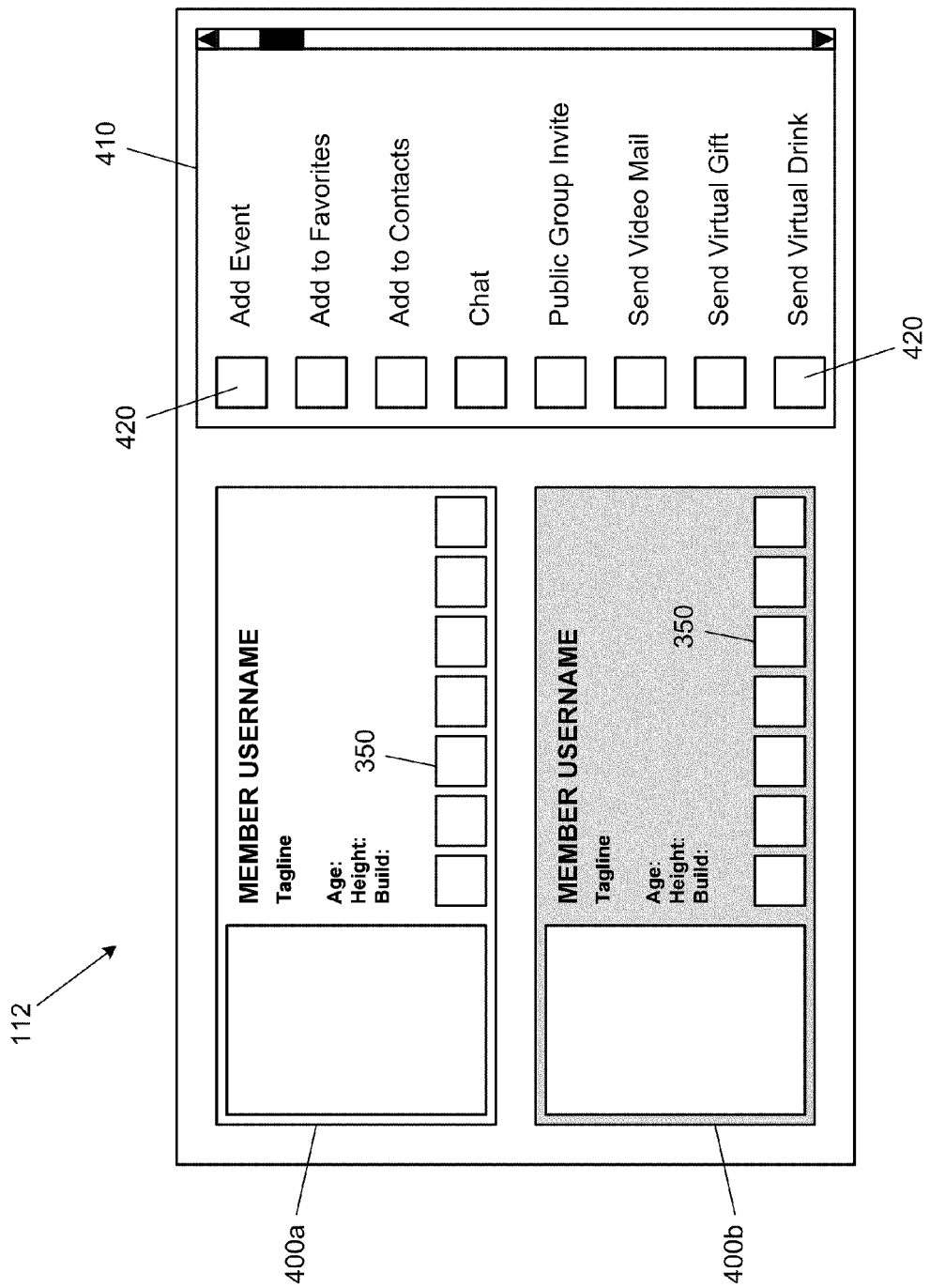
FIG. 4 illustrates a user interface for customizing action cards of the networking system, according to an exemplary embodiment of the present invention.

FIG. 4 illustrates a display presented to a currently logged-in user of the networking system 100 for customizing action cards 300 displayed to that user. The illustrated display and customization of action cards 300 can be provided to the current user via the customization unit 116 or other appropriate element of the networking system 100.

Figure 5:
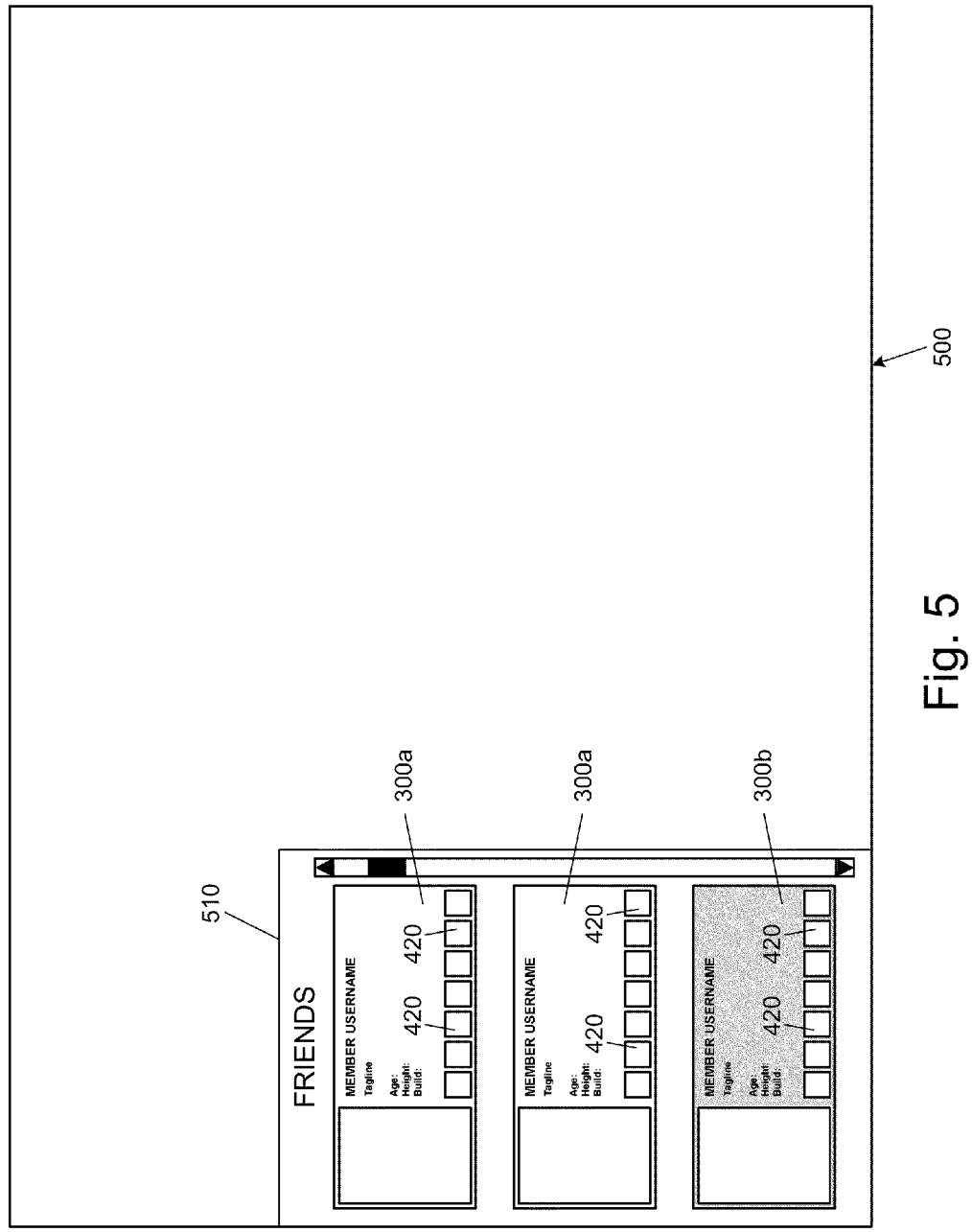
FIG. 5 illustrates a web page of the networking system, incorporating a plurality of customizable action cards, according to an exemplary embodiment of the present invention.

As shown in FIG. 4, the current user can be presented with one or more action card templates 400a and 400b, each template 400 corresponding to a type of action card 300a and 300b (see FIG. 5). Each action card 300 displayed to the current user on one or more pages of the website 180 can correspond to a subscriber of the networking system 100. The type of action card 300 corresponding to a particular subscriber can depend on categorization of the particular subscriber.

The networking system 100 can provide subscriber categories or classes, which can be system-defined, user-defined, or a combination of both. For example, and not limitation, the networking system 100 can categorize subscribers based on the type of accounts that subscribers have with the networking system 100. Types of accounts can include, for example, one or more of premium accounts, common accounts, member accounts, and celebrity accounts, which can result in the existence of premium subscribers, common subscribers, member subscribers, and celebrity subscribers. Subscribers can also be allowed to define their own categories of subscribers, including friends, business contacts, classmates, or various other categories. In some embodiments of the networking system 100, user-defined categories need not extend beyond each subscriber's user account, such that categories applied by a first subscriber need not also be available or applied by a second subscriber.

Categories can overlap with one another, so that a subscriber can belong to multiple categories. If a subscriber falls into multiple categories within a current user's account, then that subscriber's type of action card 300 can be determined based on the subscriber's priority category. For example, a subscriber can have a premium account with the networking system 100 and can therefore be in the premium category. The same subscriber can also be categorized as a business contact by a current user of the networking system 100. Accordingly, the current user's account can classify the subscriber as both a premium subscriber and a business contact. The networking system 100 can provide a formula for determining the subscriber's priority category and corresponding action card template 400. The priority formula can be system-defined or defined by the current user for use within the current user's account.

In some embodiments, the formula for determining a subscriber's priority category can be as simple as ranking the various available categories. In that case, a subscriber's priority category is simply the highest ranked category to which the subscriber belongs. Alternatively, the current user can manually select a subscriber's priority category, or a more complex formula can be used to take various factors about subscribers into consideration.

An action card template 400 can be provided to the current user for each of one or more of the categories available to the current user. Preferably, the networking system 100 allows the current user to customize an action card template 400 for each available subscriber category. As shown in FIG. 4, different action card templates 400 can differ from one another even before customization, such as by being different colors, having different background images, or having other different characteristics. Each action card 300 can inherent these distinctions from its corresponding template 400, such that action cards 300 can be quickly identifiable as corresponding to subscribers belonging to certain subscriber categories.

The networking system 100 can provide a plurality of action indicators 420. An action indicator 420 can be various displayable objects representing an operation. For example, and not limitation, an action indicator 420 can be an icon, an image, or a text string briefly describing the corresponding operation. Each action indicator 420 can represent and correspond to an action that the current user may desire to perform. In an exemplary embodiment, the action indicators 420 correspond to actions that can connect two or more subscribers in an interaction, such as a chat interaction or transmission of a message from one subscriber to another. Action indicators 420 can represent, for example, one or more of the following operations that can be performed by the networking system: add event, add note, add to contacts, add to favorites, add to taggers, blogs, chat, chat history, customize sounds, mail history, public group invite, send video mail, send virtual café item, send virtual drink, send virtual gift, SMS notification, sync to contact, watch intro video, join fan club, media gallery, call, email, write on page, or watch video. In some embodiments, the networking system 100 can also enable subscribers to create their own action indicators 420 by recording a series of tasks, and associating those tasks with a representative image, icon, text, or other object receivable by a placeholder 350 of an action card 300.

The networking system 100 can present the current user with the plurality of action indicators 420, and the current user can select a subset of the action indicators 420 to be included in the placeholders 350 of each action card template 400, where different action indicators 420 can be selected for each action card template 400. After receiving the current user's selections, the networking system 100 can then associate the selected subsets with the action card templates 400 for which the subsets were selected by the current user. Accordingly, the subscriber categories corresponding to those action card templates 400 can also be associated with the selected subsets of action indicators 420. When an action card 300 is displayed to the current user, that action card's placeholders 350 can hold the action indicators 420 selected by the current user for the applicable action card template 400. Accordingly, because action card templates 400 correspond to priority categories of subscribers, action cards 300 of subscribers belonging to different priority categories can include different sets of action indicators 420.

As shown in FIG. 4, the networking system 100 can provide a user-friendly interface for customizing action card templates 400. The interface can include an action list 410, listing or otherwise displaying action indicators 420 that are available for inclusion in an action card template 400. The action indicators 420 within the action list 410 can change based on which action card template 400 is active and currently being customized. In other words, when the current user clicks on a first action card template 400a, the action list 410 can contain the action indicators 420 available for inclusion in that template 400. If the current user then clicks on a second action card template 400b that has different action indicators 420 available to it, the action list 410 can automatically change to list the action indicators 420 that are available for inclusion in the second action card template 400. There can be various reasons why an action indicator 420 would be available to one action card template 400a and not available to another action card template 400b. For example, and not limitation, if some user accounts on the networking system 100 are celebrity accounts, it may be desirable to limit interactions with these accounts by other, non-celebrity subscribers. In this case, certain action indicators 420 representing means of communication may be unavailable for inclusion in an action card template 400 corresponding to a celebrity category, so as to limit those means of communication between celebrity and non-celebrity accounts.

The current user can select action indicators 420 for a template 400 by selecting each desired action indicator 420, such as by holding a mouse button down when the mouse cursor hovers over the action indicator 420, and then dragging the desired action indicator 420 to a placeholder 350 within the action card template 400. After an action indicator 420 is moved to a placeholder 350 in a template 400, the action indicator 420 can remain displayed in that placeholder 350 in the user-friendly customization interface to remind the current user of his or her selections. If the current user wishes to remove an action indicator 420 from a placeholder 350, he or she can simply drag the action indicator 420 out of the placeholder 350 or can replace the action indicator 420 with another action indicator 420 by selecting the other action indicator 420, such as by dragging, for the same placeholder 350.

In addition to enabling customization of placeholders 350, the networking system 100 can also allow the current user to customize the member information 310 displayed on the action cards 300.

FIG. 5 illustrates a display, such as a web page 500, presented to a current user of the networking system 100. As shown, the networking system 100 can present the current user with a plurality of action cards 300 representing other subscribers of the networking system 100.

The action cards 300 need not be displayed to the current user at all times while the current user uses the networking system 100. For example, the action cards 300 can be displayed on only the home page of the current user, or only when the user navigates to certain web pages of the networking system 100. Some exemplary embodiments, however, can display the action cards 300 on every page of the networking website 180, such as in a stationary frame object 510 of the website 180.

According to the present invention, action cards 300 need not appear similar to those depicted in FIG. 5. Rather, various web objects related to a subscriber can perform as an action card 300 for that subscriber. For example, and not limitation, a profile page of a subscriber can incorporate selected action indicators 420. In that case, when the current user visits another subscriber's profile page, the current user can see and use the action indicators 420 selected for that subscriber's priority category.

Because the networking system 100 can have numerous subscribers, not every subscriber need be represented by action cards 300 displayed to the current user. The displayed subset of action cards 300 can be selected by various means. For example, and not limitation, in some embodiments, only "friends" of the current user are represented in displayed action cards 300, or only a random subset of friends is represented. Alternatively, only subscribers currently logged in are represented in the displayed action cards 300, a rotating selection of all subscribers can be represented in the displayed action cards 300, or the current user can preselect which action cards 300 will be displayed to him or her.

After the networking system 100 determines a list of subscribers whose action cards 300 are to be displayed to the current user, a computer processor can cycle through that list of subscribers in the database 120. For each other subscriber in the list, the computer processor can determine which action card template 400 applies to that subscriber. If the listed subscriber belongs to multiple subscriber categories, then the computer processor can determine which action card template 400 to apply based on a predefined priority formula. If the listed subscriber does not belong to any category, then the networking system 100 can apply a standard action card template 400, which can be customizable by the current user in the same or a similar manner as action card templates 400 applying to specific subscriber categories. When cycling through the listed subscribers, the networking system 100 can apply the applicable action card template 400 for each listed subscriber by displaying, or otherwise providing, an action card 300 with the corresponding member information 310 for the listed subscriber and having the action indicators 420 selected by the current user for the applicable action card template 400.

The appearance of a particular action card 300, as viewed through a current user's account, can depend on various factors. These factors can include the following, without limitation: system-defined subscriber categories, subscriber categories defined by the current user, and the current user's selection of action indicators 420 for the action card template 400 corresponding to the priority category of the corresponding subscriber.

As shown in FIG. 5, action cards 300 corresponding to various subscriber categories and, therefore, based on various action card templates 400 can be displayed to the current user at a given time. As discussed previously, each displayed action card 300 can include action indicators 420 that are the same as those selected by the current user for the applicable action card template 400. For example, as displayed to the current user, each action card 300 of subscribers belonging to a first priority category can include a first subset of action indicators 420 while each action card 300 of subscribers belonging to a second priority category can include a second, possibly different, subset of action indicators 420. Because two or more subscribers belonging to the same category can be represented by action cards 300 based on the same template 400, action cards 300 for such subscribers can have the same action indicators 420. Action cards 300 of two or more subscribers belonging to different categories, however, can be based on different action card templates 400 and may therefore contain different sets of action indicators 420. Accordingly, some action cards 300 can have the same sets of action indicators 420, while others can have different sets of action indicators 420.

Because the appearances of action cards 300 are partially defined by selections made by a current user within the current user's account, a particular subscriber's action card 300 can look different when displayed to a first user than when displayed to a second user. For example, different categories can control the applicable action card template 400 for the same subscriber, as displayed through the first and second users' distinct accounts. Even if a particular subscriber is placed in the same categories by both the first and second users, the two users may still select different action indicators 420 for the action card template 400 of that category. In other words, the appearance of an action card 300 corresponding to a particular subscriber can vary between user accounts.

Because each action indicator 420 can correspond to an action performable by the networking system 100, the use of action cards 300 can enable the current user to efficiently interact with subscribers represented by displayed action cards 300. When viewing an action card 300, the current user can select a specific action indicator 420 in one of the placeholders 350 of the action card 300. Upon detecting selection of the action indicator 420, the networking system 100, such as through the action unit 118, can initiate or perform the operation corresponding to the selected action indicator 420. If the action indicator 420 represents an interactive operation, then that operation can be performed between the current user and the subscriber corresponding to the action card 300.

For instance, a first action indicator 420 can be an icon that looks like a camera and correspond to a video chat operation. If a current user selects the camera icon as one of the action indicators 420 associated with action cards 300 of a first subscriber class, then the camera icon can appear in a placeholder 350 in every action card 300 corresponding to a subscriber belonging to the first subscriber class, assuming those subscribers do not also belong to higher priority subscriber category. When the current user selects the camera icon, such as by clicking on the camera icon within a web page of the networking system 100, from within another's action card 300, the networking system 100 can receive a request for a video chat between the current user and the other. In response, the networking system 100 can respond to that video chat request, such as by sending an approval request to the other or by automatically initiating a video chat between the current user and the other. Analogously, if the selected action indicator 420 represents a "send email" operation, then the networking system 100 can open a web page or dialog for composing an email from the current user to the subscriber corresponding to the action card 300.

In addition to those action indicators 420 selected by the current user, in some embodiments of the networking system 100, an action card 300 can also include a catch-all action indicator 420. The catch-all action indicator 420 can provide the current user with quick access to additional options not covered by the selected action indicators 420. When the current user selects the catch-all action indicator 420 on a subscriber's action card 300, the user can be presented with various other operations that can be formed with respect to the subscriber corresponding to the action card 300. These other operations can be presented to the user in various ways, such as by a drop-down box displaying action indicators 420 that were not specifically selected to appear in the action card 300, or by presenting the current user with a full profile page of the corresponding subscriber.

To utilize customized action cards 300, the networking system 100 can perform various methods, including methods for customizing an action card 300, displaying a plurality of customized action cards 300, and initiating an operation based on a subscriber's use of an action card 300.

Figure 6:
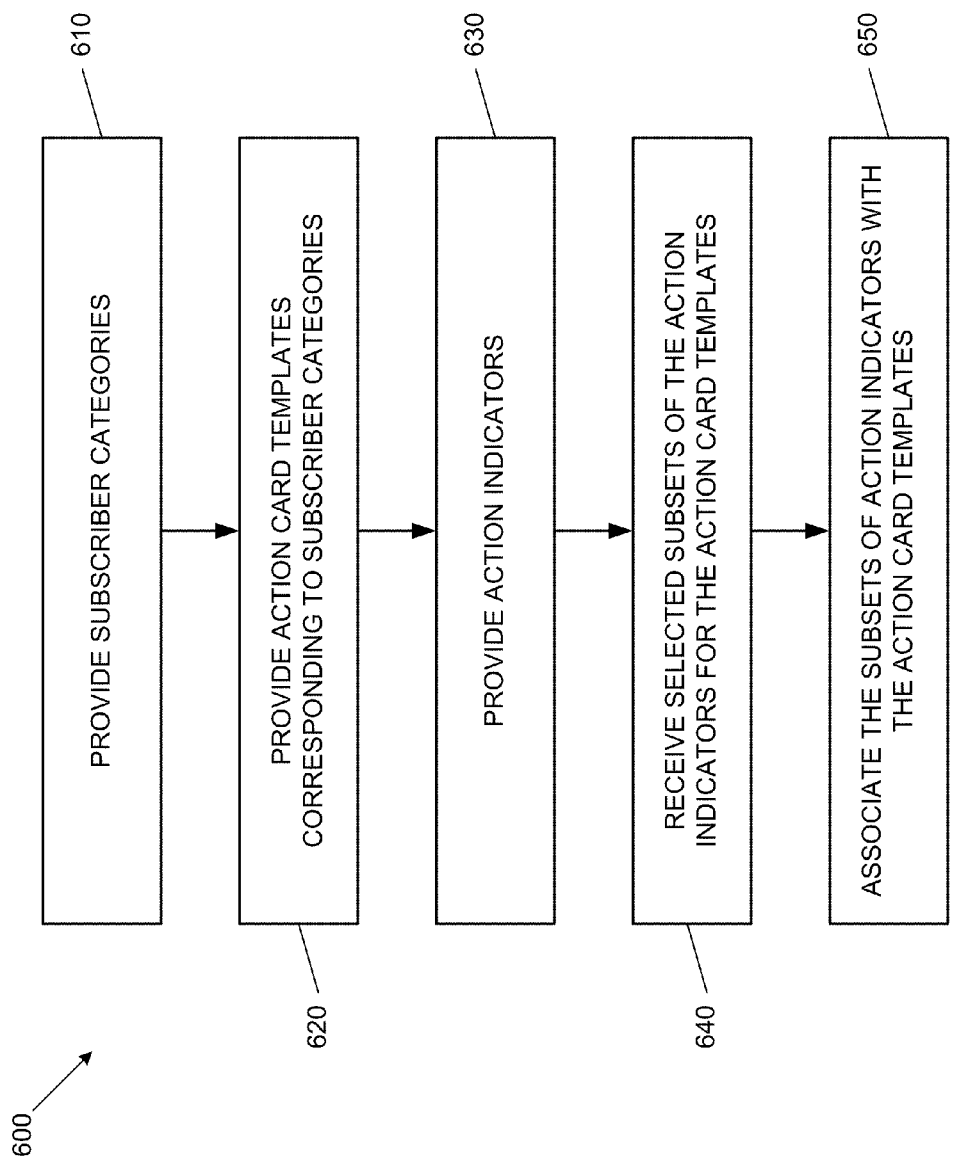
FIG. 6 illustrates a diagram of a method of customizing action cards in the networking system, according to an exemplary embodiment of the present invention.

FIG. 6 illustrates a diagram of a method 600 of customizing an action card 300 in the networking system 100, according to an exemplary embodiment of the present invention. As shown in FIG. 6, at 610, the networking system 100 can provide one or more subscriber categories. At 620, the networking system 100 can provide a one or more action card templates 400, each action card template 400 corresponding to a subscriber category. At 630, the networking system 100 can provide a plurality of action indicators. A current user can select a subset of the action indicators 420 for inclusion in an action card template 400, at 640. Finally, at 650, the networking system can associate the selected action indicators 420 with the action card template 400 and its corresponding subscriber category.

Figure 7:
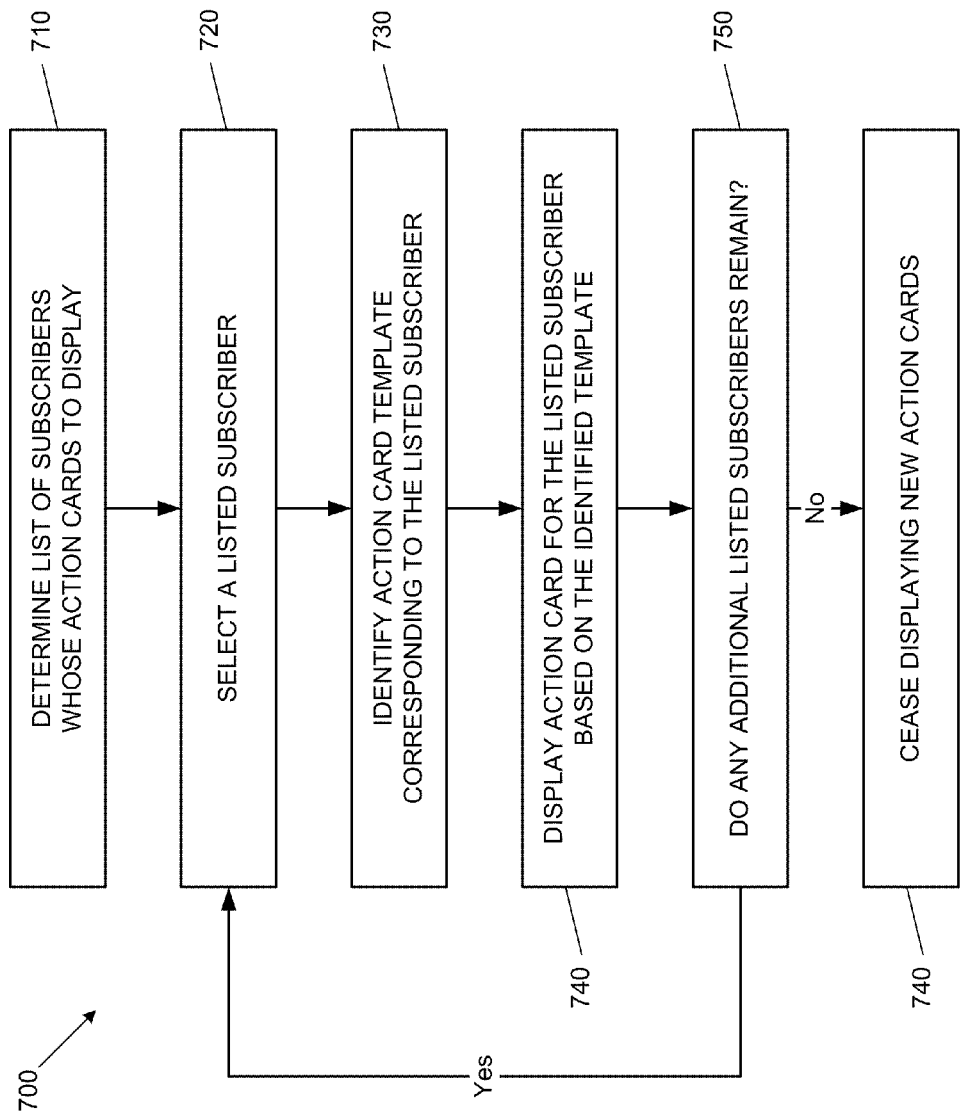
FIG. 7 illustrates a diagram of a method of displaying a plurality of customized action cards of the networking system, according to an exemplary embodiment of the present invention.

FIG. 7 illustrates a diagram of a method 700 of displaying a plurality of customized action cards 300 to a current user, according to an exemplary embodiment of the present invention. As shown in FIG. 7, at 710, the networking system 100 can determine a list of subscribers whose action cards 300 are to be displayed to the current user. At 720, the networking system 100 can focus on a single subscriber of the listed subscribers and can begin displaying an action card 300 for that listed subscriber. At 730, the networking system 100 can determine an action card template 400 that applies to the listed subscriber in question, such as by using a predetermined priority formula for prioritizing subscriber categories. The networking system 100 can display an action card 300 corresponding to the listed subscriber based on the applicable action card template 400, at 740. At 750, the networking system 100 can determine whether any more subscribers remain in the list of subscriber, and if so, the networking system 100 can switch focus to the next listed subscriber at 720. Alternatively, if no more subscribers remain in the list, then the networking system 100 can cease displaying action cards at 760.

FIG. 8 illustrates a diagram of a method 800 of initiating an operation in response to use of an action card 300, according to an exemplary embodiment of the present invention. At 810, the networking system 100 receives notice that a current user has requested performance of an operation by selecting a first action indicator 420 on a first action card 300. At 820, the networking system 100 determines which subscriber corresponds to the first action card 300. At 830, the networking system 100 determines which operation corresponds to the first action indicator 420. At 840, the networking system 100 performs for the current user the operation corresponding to the first action indicator 420. If the operation is an interaction operation, as opposed to a single-party operation, the networking system 100 performs the operation between the current user and the subscriber corresponding to the first action card 300.

FIG. 9 illustrates a diagram of a method 900 of creating an action indicator, according to an exemplary embodiment of the present invention. As shown in FIG. 9, at 910, the networking system 100 can record a series of tasks initiated by a user on the networking system. At 920, the networking system 100 can associate the recorded series of tasks with an objective receivable by a placeholder 350 of an action card 300. At 930, the networking system 100 can create an action indicator based on the recorded series of tasks and the receivable object. Finally, at 940, the created action indicator may be added to a placeholder of an action card.

Accordingly, through using customizable action cards 300, the networking system 100 can enable efficient interaction between subscribers of the networking system 100.

While the networking system 100 has been disclosed in exemplary forms, it will be apparent to those skilled in the art that many modifications, additions, and deletions may be made without departing from the spirit and scope of the system, method, and their equivalents, as set forth in the following claims.

What is claimed is:

1. A method comprising:
receiving, at a server, over a computer network, from a client computer associated with a first user account of a social networking system, a request to initiate a plurality of interaction operations between a first subscriber associated with the first user account and one or more other subscribers of the social networking system;
recording, at the server, an indication of the plurality of interaction operations;
determining a composite interaction operation based on the indication of the plurality of interaction operations, the composite interaction comprising two more interactions from the plurality of interaction operators;
modifying, by a processor, a first action card to comprise a first action indicator associated with the composite interaction operation, the first action card being displayable to the first subscriber at the client computer to indicate interaction operations performable with another subscriber;
outputting, over the computer network, for display to the first subscriber at the client computer, the first action card; and
responsive to receiving, at the server, over the computer network, from the client computer associated with the first user account, a selection of the first action indicator associated with the first action card, initiating the composite interaction operation associated with the first action indicator between the first subscriber and a target subscriber.

2. The method of claim 1, wherein the plurality of interaction operations is a series of interaction operations, and the composite interaction operation is based on the series of interaction operations.

3. The method of claim 1, wherein the composite interaction operation associated with the first action indicator comprises a communications operation.

4. The method of claim 1, wherein the composite interaction operation associated with the first action indicator is a bi-directional interaction operation.

5. The method of claim 1, wherein the social networking system comprises a plurality of subscriber categories including a first subscriber category and a second subscriber category, each of the plurality of subscriber categories being associated with a standard subset of a plurality of action indicators, and wherein the first subscriber and a second subscriber are associated with the first subscriber category and second subscriber category, respectively.

6. A non-transitory computer-readable medium that stores instructions that, when executed by at least one processor in a system, cause the system to perform a method comprising:

providing a plurality of user accounts for interacting with a social networking system, each user account being associated with a subscriber;

providing a plurality of action indicators, each action indicator being associated with a respective interaction operation between at least two subscribers of the social networking system and comprising a selectable shortcut for initiating the respective interaction operation between the at least two subscribers;

providing a plurality of action cards, each action card comprising a subset of the plurality of action indicators, and being displayable to an associated subscriber to indicate interaction operations performable with another subscriber;

outputting, over the computer network, for display to a first subscriber at a client computer associated with a first user account of the plurality of user accounts, a first action card comprising a first subset of the plurality of action indicators performable with a first target subscriber, when a profile page of the social networking system associated with the first target subscriber is not being displayed to the first subscriber, and outputting, over the computer network, for display to the first subscriber at the client computer associated with the first user account of the plurality of user accounts, a second action card comprising a second subset of the plurality of action indicators performable with a second target subscriber, wherein the first subset and the second subset are different subsets of the plurality of action indicators;

responsive to receiving, at the server, over the computer network, from the client computer associated with the first user account, an indication of a selection of a first action indicator associated with the first action card, initiating the interaction operation associated with the first action indicator between the first subscriber and the first target subscriber, wherein the second action card does not comprise the first action indicator; and determining whether a plurality of subscribers, including the first target subscriber and the second target subscriber, are currently logged-in to the social networking system, wherein the outputting for display of the first action card and the second action card to the first subscriber is responsive to determining that the first target subscriber and the second target subscriber are currently logged in.

\* \* \* \* \*